(12) United States Patent (10) Patent No.: US 9,036,506 B2
Bond et al. (45) Date of Patent: *May 19, 2015

(54) TRILL SHORTEST PATH FIRST IMPLEMENTATION

(71) Applicant: INTERNATIONAL BUSINESS MACHINES CORPORATION, Armonk, NY (US)

(72) Inventors: David M. Bond, Epsom, NH (US); Meenakshi R. Kaushik, Sunnyvale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,017

(22) Filed: Nov. 4, 2013

(65) Prior Publication Data

US 2014/0098707 A1 Apr. 10, 2014

Related U.S. Application Data

(63) Continuation of application No. 13/647,311, filed on Oct. 8, 2012.

(51) Int. Cl.
*H04L 12/759* (2013.01)
*H04L 12/721* (2013.01)

(52) U.S. Cl.
CPC .............. *H04L 45/028* (2013.01); *H04L 45/12* (2013.01)

(58) Field of Classification Search
USPC .................................. 370/235, 238, 252, 254
See application file for complete search history.

(56) References Cited

U.S. PATENT DOCUMENTS

| 7,697,556 B2 | 4/2010 | Gray |
| 2006/0045024 A1 | 3/2006 | Previdi et al. |
| 2006/0159082 A1 | 7/2006 | Cook et al. |
| 2007/0263554 A1 | 11/2007 | Finn |
| 2008/0051036 A1 | 2/2008 | Vaswani et al. |
| 2008/0062862 A1* | 3/2008 | Goyal et al. .................. 370/218 |
| 2010/0061269 A1 | 3/2010 | Banerjee et al. |
| 2010/0214927 A1 | 8/2010 | Qian et al. |
| 2011/0170406 A1 | 7/2011 | Krishnaswamy |

OTHER PUBLICATIONS

Touch et al., Transparent Interconnection of Lots of Links (TRILL): Problem and Applicability Statement (RFC5556), IP.com, May 1, 2009, pp. 1-17, IPCOM000183374D.
Eastlake, et al., Routing Bridges (RBridges): Adjacency (RFC6327), IP.com, Jul. 1, 2011, pp. 1-26, IPCOM000209002D.
Office Action from U.S. Appl. No. 13/647,311 dated Mar. 26, 2014.

* cited by examiner

*Primary Examiner* — Kerri Rose
(74) *Attorney, Agent, or Firm* — Shimokaji & Associates, P.C.

(57) ABSTRACT

A shortest path first (SPF) computation in a distributed network may be performed efficiently by performing the SPF computation in stages. Rather than perform a new SPF computation every time a change occurs affecting a link state within the distributed network, a routing protocol may identify the change and determine if the impact to the link state necessarily needs the new SPF computation. For example, a predetermined list of events may identify changes that may not necessarily impact the SPF value(s) currently associated with the distributed network. Embodiments disclosed may avoid computation of the new SPF for changes to the link state thus managing network system resources more efficiently.

5 Claims, 6 Drawing Sheets

TRILL SHORTEST PATH FIRST IMPLEMENTATION

RELATED APPLICATIONS

The present continuation application claims the benefit of priority of U.S. application Ser. No. 13/647,311, filed Oct. 8, 2012, which application is incorporated herein by reference in its entirety.

BACKGROUND

The present invention relates to network management, and more specifically, to a Transparent Interconnect of Lots of Links (TRILL) Shortest Path First (SPF) implementation.

Managing packet traffic within a network typically involves computing the SPF to efficiently direct packets for quickest transmission between two points. In a TRILL campus, network topologies may be distributed. For example, there may be several network trees that can provide a path for packet traffic. Under a TRILL standard, the SPF is typically calculated for each tree. As a network grows, the SPF time for each tree may increase. Every instance of a change in an underlying link-state protocol may require re-computation of the SPF for each tree. Moreover, within a TRILL campus, the SPF is typically re-computed for both unicast and multicast distributions. For example, in a campus with 5 shared multi-destination trees, every SPF interval may compute the SPF for (5+1) runs. As the campus grows and/or as traffic increases and link state changes occur, the amount of computation required may overwhelm network resources.

SUMMARY

According to another embodiment of the present invention, a method of implementing a Shortest Path First (SPF) computation comprises identifying a plurality of network elements connected together as a distributed network. One or more predetermined events occurring in the distributed network under a link state protocol (LSP) may be identified. The SPF computation in the distributed network may be implemented by a processor except when the identified predetermined events trigger a change in the LSP.

According to one embodiment of the present invention, a computer program product for performing a Shortest Path First (SPF) computation in a network, comprises a computer readable storage medium having computer readable program code embodied therewith. The computer readable program code is configured to identify a plurality of network elements connected together as a distributed network, operating under a link state protocol (LSP), identify a change in the LSP occurring in the distributed network, determine whether the change in the LSP impacts an SPF value on the distributed network, and perform the SPF computation in the distributed network only when the change in the LSP impacts the SPF value.

According to yet another embodiment of the present invention, a network system comprises a plurality of network elements connected together in a distributed network. The network system includes a server connected to the distributed network, the server being configured to identify a change in the distributed network, reference a list of predetermined events, determine whether the change corresponds to one of the predetermined events, and compute a shortest path first (SPF) value for the distributed network if the change is not one of the predetermined events.

DETAILED DESCRIPTION

Figure 1:
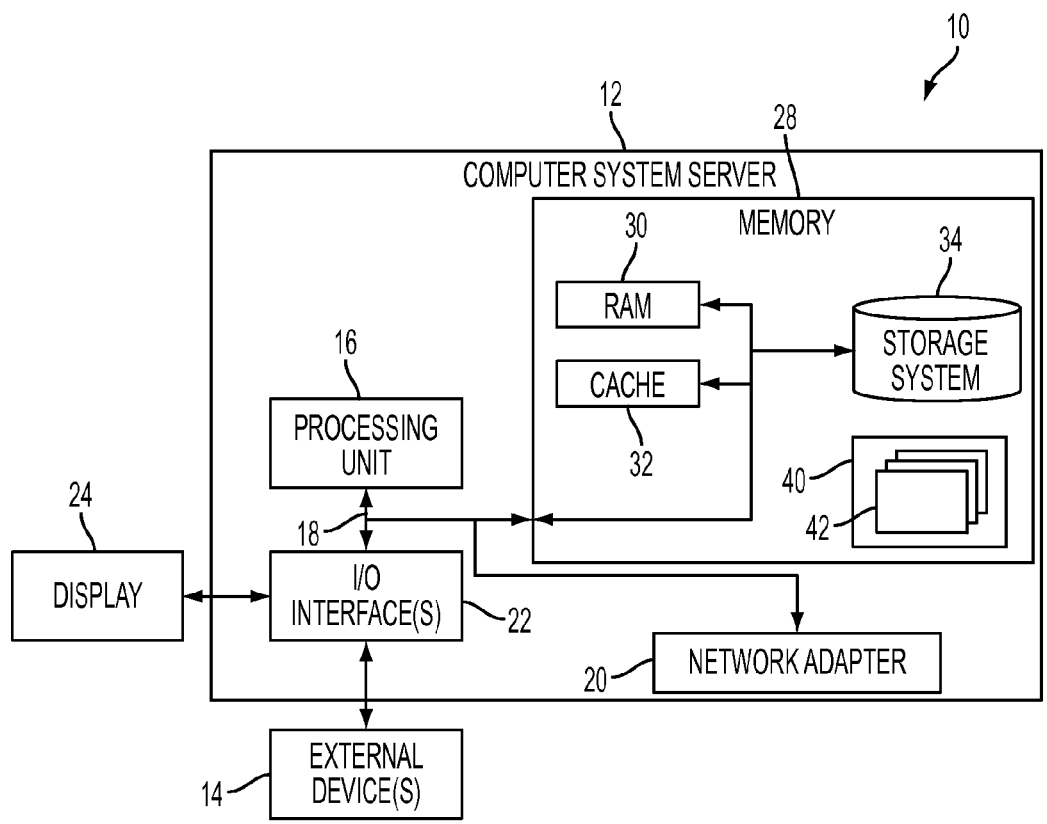
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may include:

On-demand self-service: a cloud consumer can unilaterally provision computing capabilities, such as server time and network storage, as needed, automatically, without requiring human interaction with the service's provider.

Broad network access: capabilities are available over a network and accessed through standard mechanisms that promote use by heterogeneous thin or thick client platforms (e.g., mobile phones, laptops, and PDAs).

Cloud Software as a Service (SaaS): the capability provided to the consumer may be to use the provider's applications running on cloud infrastructure. The applications may be accessible from various client devices through a thin client interface such as a web browser (e.g., web-based email). The consumer need not necessarily manage or control the underlying cloud infrastructure including network, servers, operating systems, storage, or even individual application capabilities, with the possible exception of limited user-specific application configuration settings.

Resource pooling: the provider's computing resources may be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities may be rapidly and elastically provisioned, in some cases automatically to quickly scale out, and may be rapidly released to quickly scale in. To the consumer, the capabilities available for provisioning often appear to be unlimited and can be purchased in any quantity at any time.

As will be appreciated by one skilled in the art, aspects of the present invention may be embodied as a system, method or process, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus may provide processes for implementing the functions/acts specified in the flowchart and/or block diagram block or blocks.

Referring now to FIG. 1, a schematic of an example of a cloud computing node 10 is shown. The cloud computing node 10 illustrated is only one example of a suitable cloud computing node and is not intended to suggest any limitation as to the scope of use or functionality of embodiments of the invention described herein. Regardless, the cloud computing node 10 is capable of being implemented and/or performing any of the functionality set forth herein.

In the cloud computing node 10 there is a computer system/server 12, which is operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, a computer system/server 12 in the cloud computing node 10 is shown in the form of a general-purpose computing device. The components of the computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 may typically include a variety of computer system readable media. Such media could be chosen from any available media that is accessible by computer system/server 12, including volatile and non-volatile media, removable and non-removable media.

The system memory 28 could include one or more computer system readable media in the form of volatile memory, such as a random access memory (RAM) 30 and/or a cache memory 32. The computer system/server 12 may further include other removable/non-removable, volatile/non-volatile computer system storage media. By way of example only, a storage system 34 can be provided for reading from and writing to a non-removable, non-volatile magnetic media device typically called a "hard drive" (not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. Alternatively, the computer system/server 12 can communicate with one or more networks such as a local area network (LAN), a general wide area network (WAN), and/or a public network (e.g., the Internet) via a network adapter 20. As depicted, the network adapter 20 may communicate with the other components of the computer system/server 12 via the bus 18. It should be understood that although not shown, other hardware and/or software components could be used in conjunction with the computer system/server 12. Examples include, but are not limited to: microcode, device drivers, redundant processing units, external disk drive arrays, RAID systems, tape drives, and data archival storage systems, etc.

Figure 2:
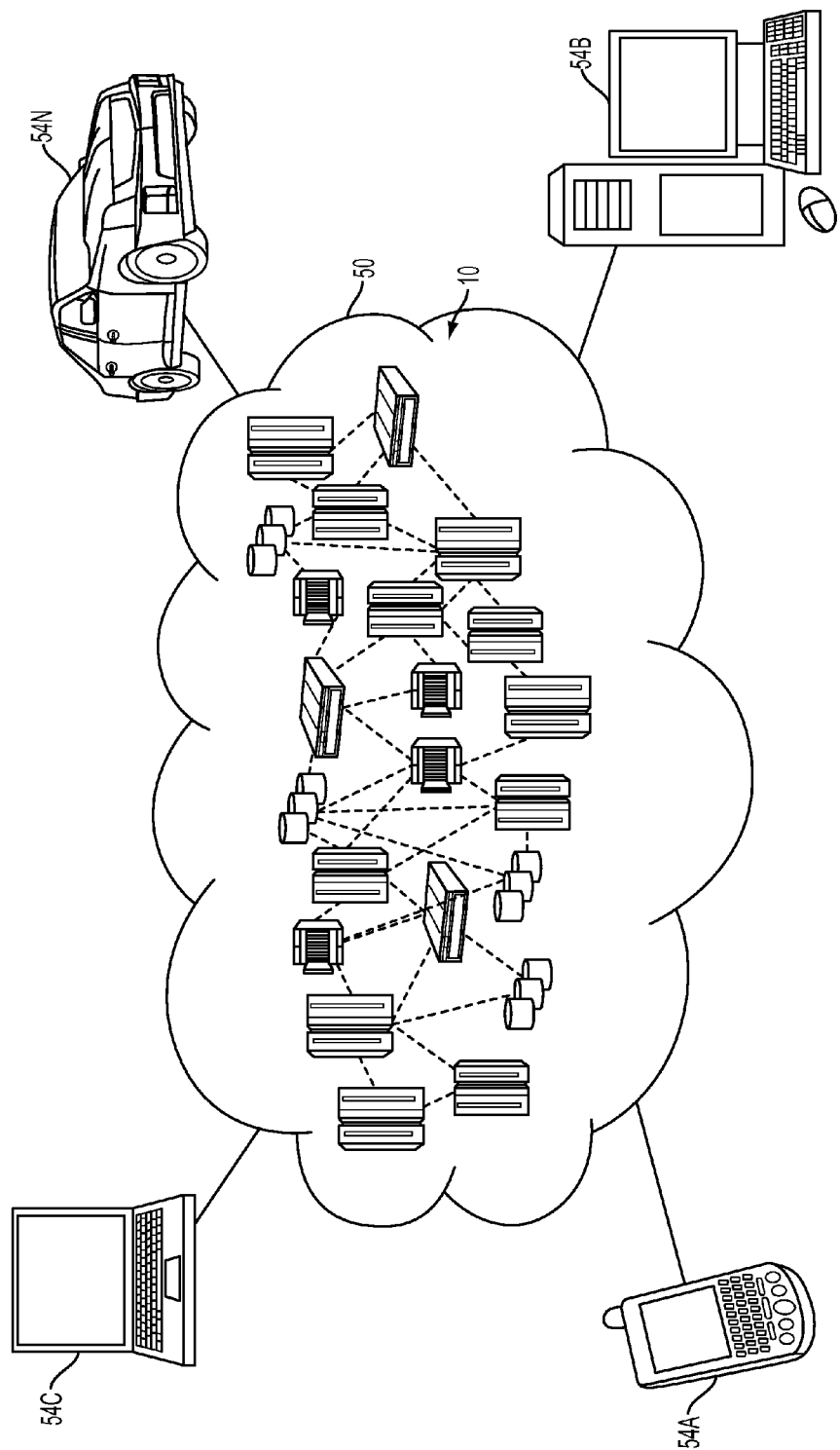
FIG. 2 depicts a cloud computing environment according to another embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, a personal digital assistant (PDA) or a cellular telephone 54A, desktop computer 54B, laptop computer 54C, and/or a automobile computer system 54N, may communicate. The nodes 10 may communicate with one another. They may be grouped physically or virtually, in one or more networks, such as Private, Community, Public, or Hybrid clouds as described hereinabove, or a combination thereof. This allows cloud the computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that the computing nodes 10 and the cloud computing environment 50 can communicate with any type of computerized device over any type of network and/or network addressable connection (e.g., using a web browser).

Figure 3:
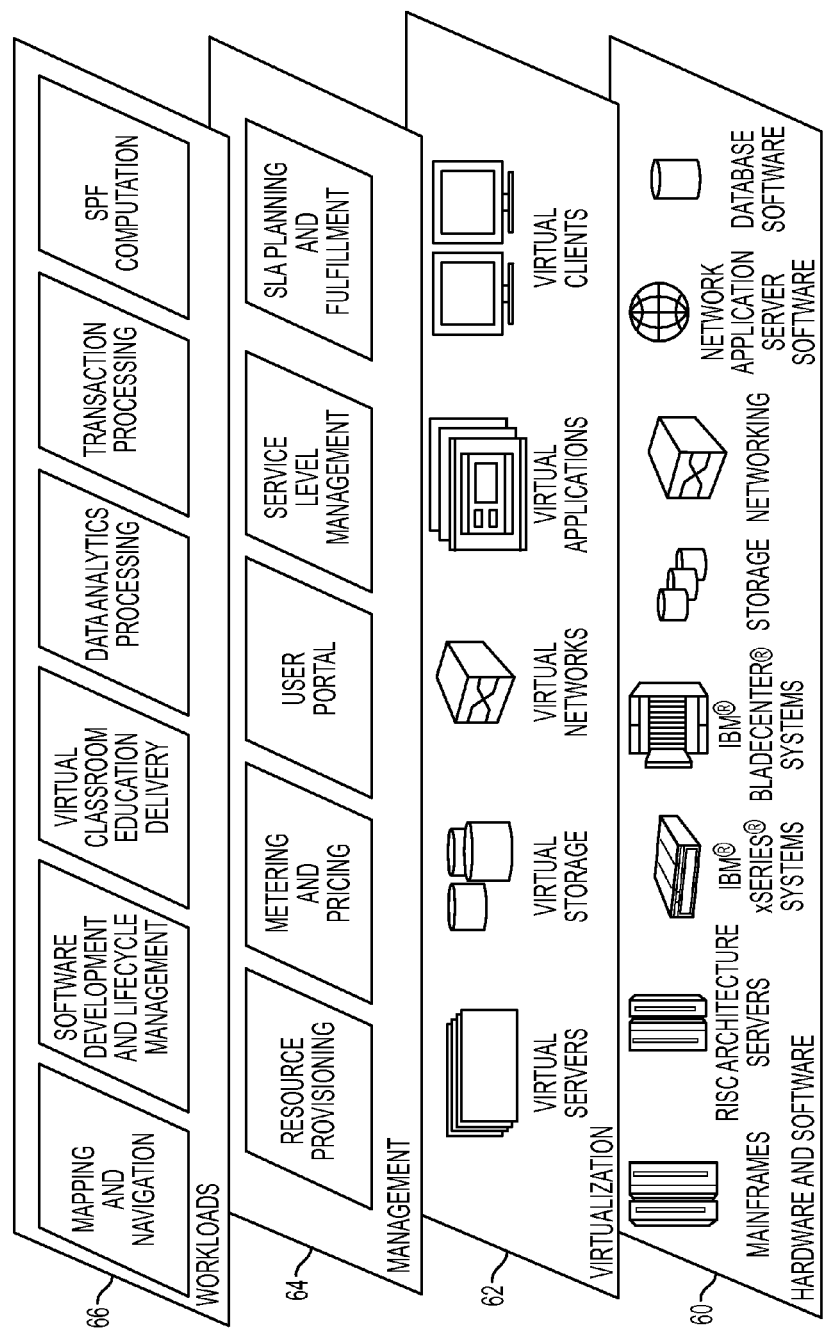
FIG. 3 depicts abstraction model layers according to yet another embodiment of the present invention.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 may include hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

A virtualization layer 62 provides an abstraction layer from which the following examples of virtual entities may be provided: virtual servers; virtual storage; virtual networks, including virtual private networks; virtual applications; and operating systems; and virtual clients.

In one example, a management layer 64 may provide the functions described below. Resource provisioning may provide dynamic procurement of computing resources and other resources that are utilized to perform tasks within the cloud computing environment. Metering and Pricing may provide cost tracking, as resources are utilized within the cloud computing environment, and may provide billing or invoicing for consumption of these resources. In one example, these resources may comprise application software licenses. Security may provide identity verification for cloud consumers and tasks, as well as protection for data and other resources. A user portal may provide access to the cloud computing environment for consumers and system administrators. Service level management may provide cloud computing resource allocation and management such that required service levels are met. Service Level Agreement (SLA) planning and fulfillment may provide pre-arrangement for, and procurement of, cloud computing resources for which a future requirement is anticipated in accordance with an SLA.

A workloads layer 66 may provide functionality for which the cloud computing environment may be utilized. Examples of workloads and functions that may be provided from this layer include: mapping and navigation; software development and lifecycle management; virtual classroom education delivery; data analytics processing; transaction processing; and SPF computing implementation.

events that may not affect the SPF computation may be stored as a table. An exemplary table of predetermined events is shown in Table 1.

In the first column, Table 1 shows an event. In the second column, a projected impact on the distributed network 150 is shown. In the third column, a determination of whether an SPF computation should be run and how the SPF computation should be run is shown. In the fourth column, an SPF flag corresponding to the event and determination is shown. The SPF flag may be attached to a data packet including instructions on how to handle the LSP change.

TABLE 1

| LSP Information Change | SPF Module Impact | SPF - what to run? | SPF Flag |
|---|---|---|---|
| Nbr ID Change | Part of ECMP - Just switch to the other ECMP link | No SPF computation; just change state based on the previous stored state | Outside of SPF - below - ECMP LSP delete -- |
| Nbr ID Change | Not Part of ECMP | Trigger full-blown (Unicast + Multi-destination) SPF | SPFTrgCount |
| D-Tree Root List change due to change in D-Tree priority | New D-Tree Root for multi-destination traffic | Trigger only the multi-destination SPF for the "new" D-Tree Root | SPFDTreeTrgCount |
| Nickname/ Collision Detection | Nickname in the forwarding list changes | No SPF computation; re-map the IS-IS Sys ID to Nickname learning and build the forwarding table. | NickNoSPFTrgCount |
| Forwarding (AF VLAN) change | VLAN Pruning List change | No SPF computation; only re-trigger building the VLAN prune list | VlMcastNoSPFTrgCount |
| Multicast membership change | Change the multicast prune list | No SPF computation; only retrigger building the multicast prune list | VlMcastNoSPFTrgCount |

Figure 4:
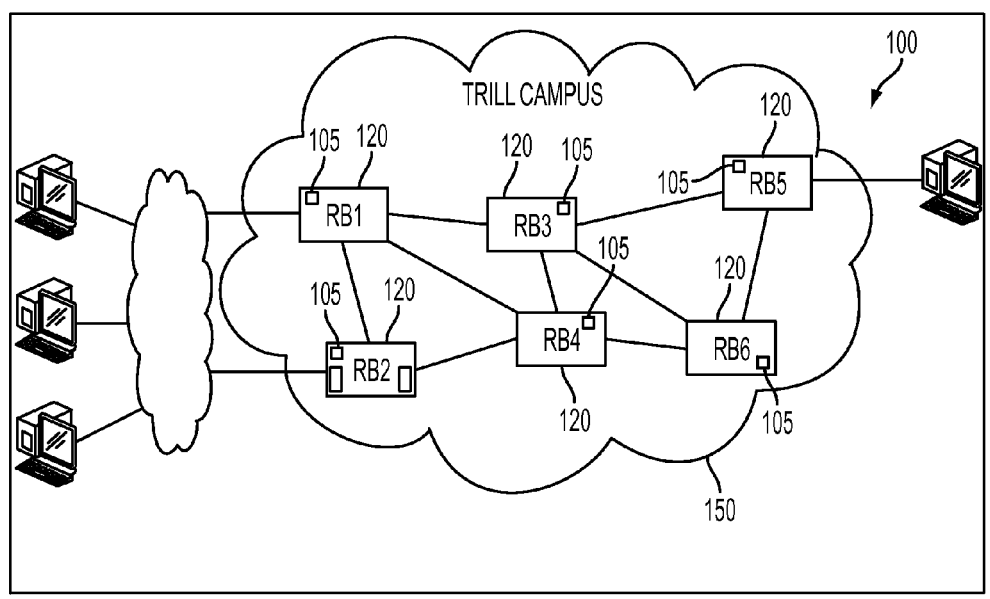
FIG. 4 is a block diagram of a network system according to yet another embodiment of the present invention.

Referring now to FIG. 4, a network system 100 is shown according to an exemplary embodiment of the present invention. The network system 100 may include a plurality of network elements 120. In an exemplary embodiment, a distributed network 150 may operate under a transparent lots of links (TRILL) standard. The network elements 120 may each include a respective processor 105. The network elements between 120 may include, for example, switches, routing bridges, or servers. The network elements 120 may be connected together within the distributed network 150. The distributed network 150 may include unicast and multicast distribution tree paths.

Each processor 105 may employ a routing protocol configured to determine network traffic paths; for example, the unicast or multicast distribution tree paths. In an exemplary embodiment, network traffic in the distributed network 150 may operate under an Intermediate System to Intermediate System (IS-IS) routing protocol. The status of the network elements 120 within the distributed network 150 may be governed, for example, by a link state protocol (LSP). Changes to the LSP may, in some cases, trigger a shortest path first (SPF) computation for the distributed network 150.

In an exemplary embodiment, rather than compute the SPF for every change to the LSP, the routing protocol may invoke a series of determinations that determine whether a change to the LSP does indeed impact the SPF computation for the distributed network 150. For example, a predetermined list of Referring still to the table, the rows show exemplary events in the distributed network 150 triggering an LSP change. The first and second rows list two potential ways to handle a neighbor identification change event in the distributed network 150. The neighbor identification change may represent for example, when the status of a network element 120 along a distribution path changes. In row 1, if the network element 120 is part of an equal cost multi-path (ECMP) route, then the routing protocol may switch packet traffic to another link (network element 120) on the same ECMP route. The routing protocol may determine that the distributed network 150 may not necessarily need a new SPF computation. It may be appreciated that since the value of the ECMP route has not changed, then the SPF computation for the distributed network 150 has not changed. A packet may thus be flagged as "Outside of SPF—below—ECMP LSP delete—". The previous ECMP route may be deleted from a forwarding table without invoking an SPF computation for the distributed network 150. In row 2, if the network element 120 is not part of an ECMP route, then the routing protocol may determine that an SPF computation may be performed on the distributed network 150. SPF computations for both unicast and multicast destinations may be performed. A packet may include the flag "SPFTrgCount" signaling the SPF computation may need performing.

Row 3 shows how the routing protocol may handle a change in a distribution tree. Changes in a distribution tree root list, for example, may need the routing protocol to determine a new distribution tree root for multi-destination traffic. The routing protocol may determine that an SPF computation may be needed only for the new distribution tree root path. As may be appreciated, while a new SPF computation is performed, the SPF computation is performed for only a portion of the distributed network 150 rather than for the entire group of network elements 120 in the distributed network 150. A packet may include the flag "SPFDTreeTrgCount" signaling the type of event and triggering the SPF computation according to this type of event.

Row 4 shows how the routing protocol may handle potential nickname conflicts among naming of network elements 120 in paths of the distributed network 150. Conflicting nicknames may result in a naming change in a forwarding list for a path. The routing protocol may determine that a change to a nickname may not need a new SPC computation for the distributed network 150. Rather, the network elements 120 may be renamed as needed and a new forwarding table built. Thus, changes on the routing path(s) associated with the previously conflicting nicknamed network elements 120 may be avoided, precluding a change to the SPF computation. A packet may include the flag "NickNoSPFTrgCount" signaling the type of event and the preclusion of performing the SPF computation.

Rows 5 and 6 show how the routing protocol may handle pruning events in the distributed network 150. Pruning events in general may be determined to preclude SPF computation on the distributed network 150 and packets associated with a pruning event may be flagged to preclude SPF computation.

Figure 5:
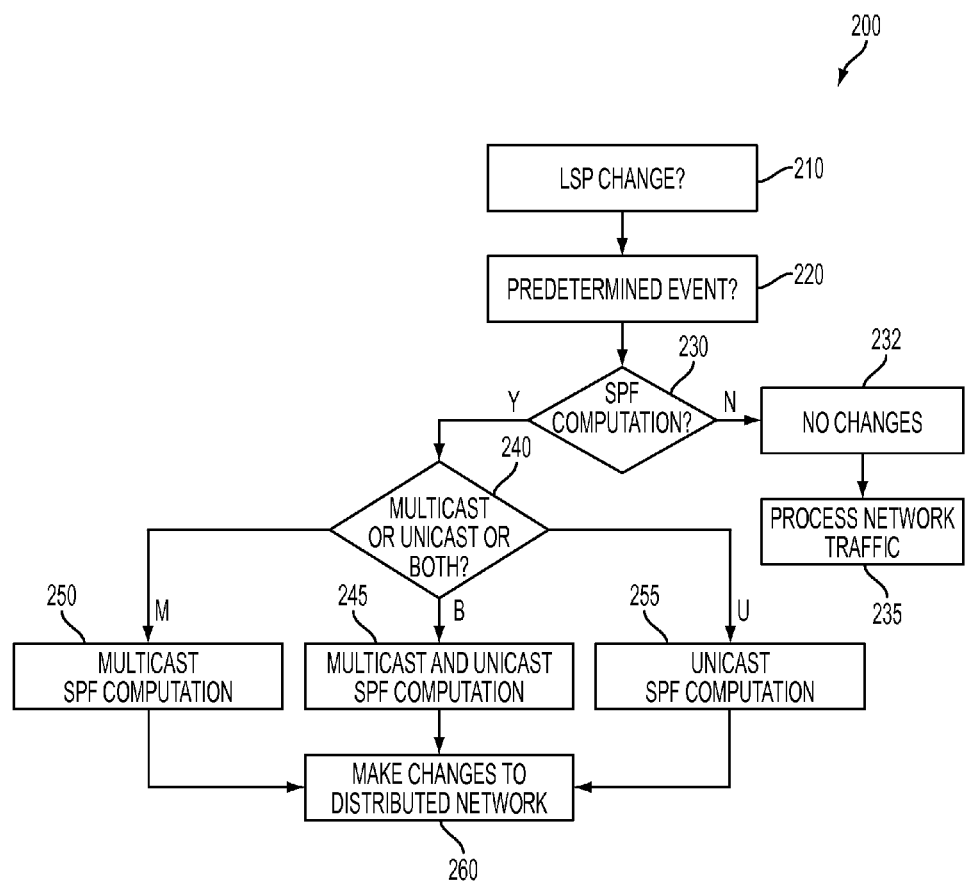
FIG. 5 is a flow chart of a method of triggering an SPF computation in the network system of FIG. 4 according to yet another embodiment of the present invention.

Referring now to FIG. 5, a method 200 of triggering an SPF computation is shown according to an exemplary embodiment of the present invention. The method 200 may, in general, compute an SPF value for a distributed network in stages. For example, the routing protocol may determine (210) if an LSP change occurs on the distributed network. The routing protocol may identify (220) whether one of a transient network event of "predetermined" type of events has triggered the LSP change. The routing protocol may determine (230) whether a new SPF computation may be performed depending on whether the LSP change is one of the predetermined events. If the routing protocol determines that the LSP change is indeed one of the predetermined events, then the routing protocol may determine (232) that no changes to the SPF may be needed may not necessarily perform a new SPF computation. The routing protocol may continue to process (235) network traffic according to the SPF value currently stored for the distributed network. Otherwise, the routing protocol determines (240) whether to provide computation for multicast distribution and/or unicast distribution. In some embodiments, the routing protocol may determine that the LSP change is not one of the predetermined events, in which case a new SPF value may be computed (245) for both a multicast distribution and a unicast distribution. In some embodiments, a predetermined event may also invoke the routing protocol to compute (250) a new SPF value for only a multicast distribution. In some embodiments, a predetermined event may also invoke the routing protocol to compute (255) a new SPF value for only a unicast distribution. The routing protocol may proceed to enable (260) changes to network elements within the distributed network.

Figure 6:
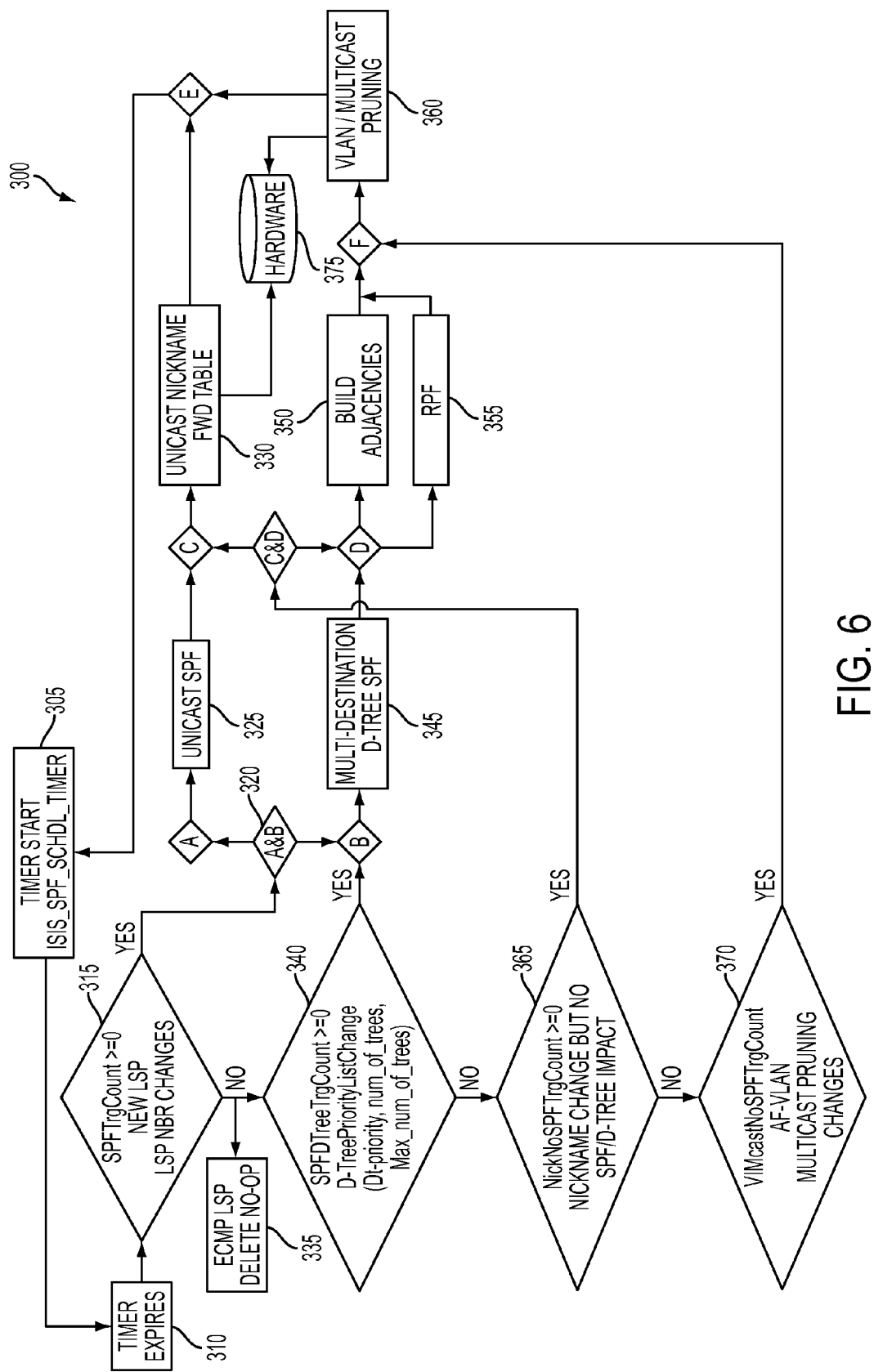
FIG. 6 is a flow chart of a method of implementing SPF computations in the network system of FIG. 4 according to still another embodiment of the present invention.

Referring now to FIG. 6, a method 300 of implementing a SPF computation is shown according to an exemplary embodiment of the present invention. The routing protocol may trigger (305) a timer which checks fields in network packets for LSP changes in the distributed network. The timer may cycle, periodically preventing the routing protocol from being tied up by constant computations of SPF. After the timer expires (310), the routing protocol may determine (315), for example, whether a field shows an LSP neighbor change occurred in the distributed network.

As described previously, if a neighbor change is detected and the neighbor change is not part of an ECMP, then the routing protocol may determine (320) that both a unicast and multicast SPF computation may be performed. The routing protocol may perform (325) the unicast SPF computation which may invoke changing (330) entries in a forwarding table. The routing protocol may also perform (345) the multicast SPF computation. The routing protocol may build (350) a table of adjacent network elements within the multicast destination trees. The routing protocol may enable (355) reverse path forwarding in the network traffic. The routing protocol may perform (360) any VLAN or multicast pruning if needed. The routing protocol may enable (375) changes to any hardware elements in the distribution network based on the results of the neighbor identification change. When a neighbor change is not detected or a neighbor change is determined as part of an ECMP route, then previous ECMP route may be deleted (335) from a forwarding table without invoking an SPF computation for the distributed network.

The method 300 may also determine (340) whether a change occurred to a distribution tree. If no changes to distribution trees are detected, then the routing protocol may continue checking other fields without computing a new SPF. If there was a change to a distribution tree, then the routing protocol may perform (345) the multicast SPF computation. (Steps 350, 355, 360, and 375 may be invoked as described above.

The method 300 may also determine (365) whether a nickname change has occurred in the distributed network. If a nickname change is not detected, then the routing protocol may continue checking fields for changes and may refrain from computing a new SPF until appropriate. If a nickname change is detected, then the routing protocol may invoke steps 330, 350, 355, 360, and 375 as described above.

The method 300 may also determine (370) whether a change is related to a pruning event and may refrain from computing a new SPF until appropriate. The routing protocol may perform (360) any VLAN or multicast pruning and may invoke step 375 thereafter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of implementing a Shortest Path First (SPF) computation, comprising:
    identifying a plurality of network elements connected together as a distributed network;
    identifying one or more predetermined events occurring in a status of one of the plurality of network elements in the distributed network under a link state protocol (LSP); and
    implementing, by a processor, the SPF computation only for a multicast distribution in the distributed network except when the identified one or more predetermined events trigger a change in the LSP, wherein the one or more identified predetermined events includes a change in a distribution tree.

2. The method of claim 1, wherein the distributed network operates under a Transparent Interconnect of Lots of Links (TRILL) standard.

3. The method of claim 1, wherein the distributed network operates under an Intermediate System to Intermediate System (IS-IS) routing protocol.

4. The method of claim 1, wherein the one or more identified predetermined events includes a neighbor identification change.

5. The method of claim 1, wherein the one or more identified predetermined events includes a name change among the network elements.

* * * * *